Patented May 22, 1934

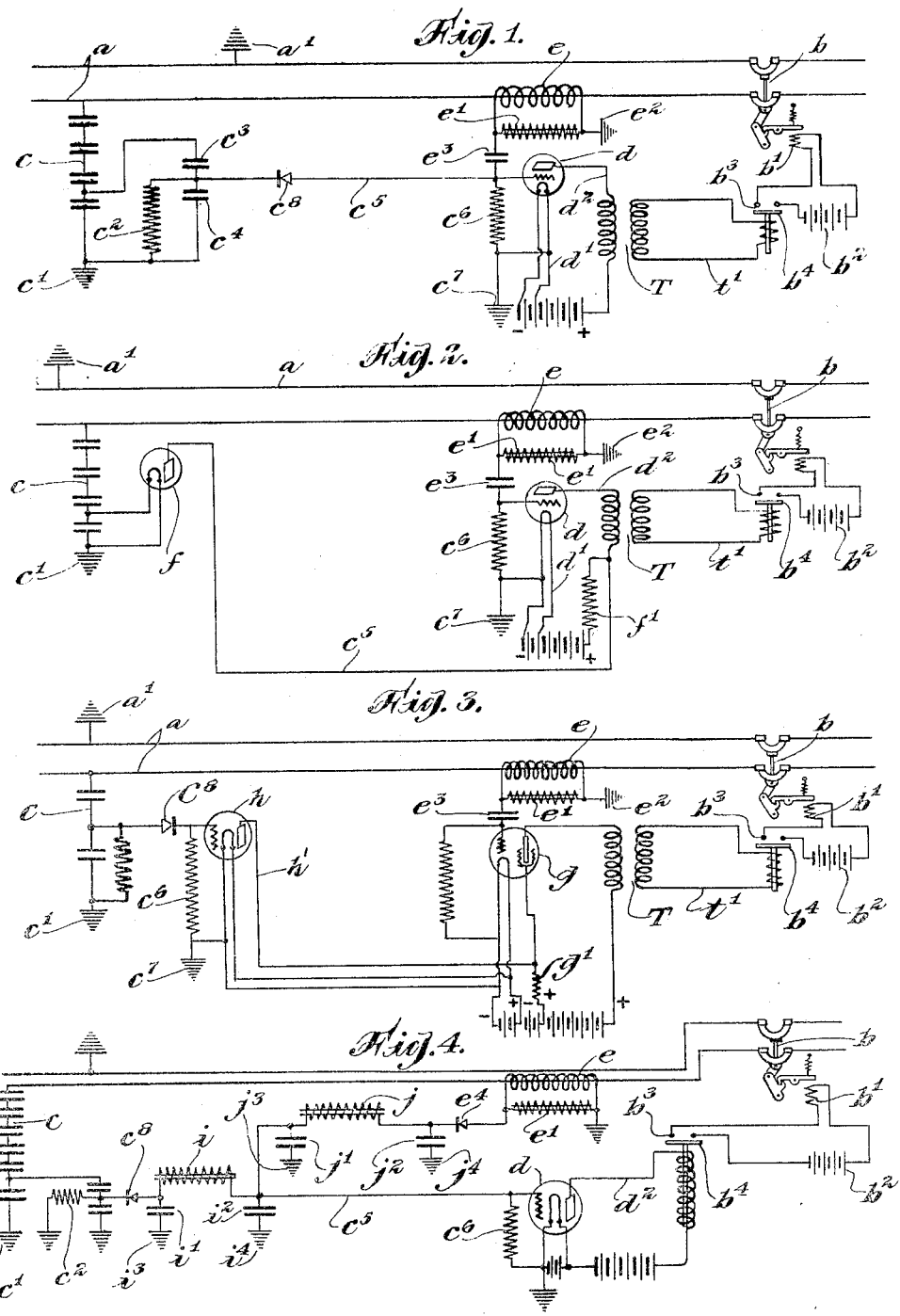

1,960,083

UNITED STATES PATENT OFFICE 1,960,083

PROTECTIVE DEVICE FOR ALTERNATING CURRENT TRANSMISSION LINES

Gerald Vincent Cruise, Jackson Heights, N. Y., and Sol Eli Schultz, Bogota, N. J.

Application October 8, 1928, Serial No. 311,234

12 Claims. (Cl. 175—294)

The present invention relates to protective devices for alternating current transmission lines by means of which a faulty section thereof is disconnected without disturbing other sections between the faulty section and the power source or sources. The transmission line may consist of one, two, three or more phases, a single phase being shown herein. Devices have been constructed in which relays and other suitable mechanism operate to isolate the faulty section of a transmission line before the remaining sections are affected, but it has been often found that they are unsatisfactory either because too much time is required for them to function or because they do not properly discriminate between a faulty and a sound section.

More particularly the invention embodies an improved means for detecting and isolating a fault in a transmission line, the improved structure being extremely sensitive to changing conditions in the line and capable of disconnecting the faulty section before the disturbance affects the adjacent sections.

When a fault, such as a short circuit occurs in a transmission line, the line voltage at the fault approaches zero and increases in proportion to the impedance of the line as the distance from the fault increases. The current on the other hand is at least as great in the faulty section as in any of the others. If the line is sectionalized by placing a given number of disconnecting mechanisms at stations along its length, the voltage at each respective station will vary in proportion to the distance of the station from the fault. The current however will be at least as great at the station nearest the fault as at any other station. By employing a device which is actuated by the current but retarded by the voltage, the disconnecting of the faulty section before the more distant stations are actuated, is effected. The sensitive nature of the mechanism is such as to insure the operation of the station nearest the fault before the disturbance can cause the more distant stations to operate.

In its broadest aspect, the invention comprises tapping currents from a transmission line, the magnitude of one of which is proportional to the voltage in the line, and the magnitude of the other, proportional to the current in the line, one of these currents producing a direct current. They are then combined to actuate a relay with an inverse time characteristic wherein the effect of the voltage is caused to exert a counter effect tending to destroy the effect of the current. When a fault occurs the effect of the current is greatly increased while the opposing voltage effect is almost completely removed thus actuating the relay in a time interval inversely proportional to the current in the relay coils.

More specifically the invention utilizes an electron tube, the anode circuit of which includes a relay for disconnecting the transmission line. A suitable current transformer is so connected that its secondary current produces a voltage between two of the elements of the tube, that is directly proportional to the magnitude of the current in the transmission line. A current taken from a condenser string tapped to the line is caused to produce a direct current which produces a difference of potential between two elements of the tube, this difference of potential being directly proportional in magnitude to the voltage in the transmission line. Ordinarily, this difference in potential prevents an appreciable current flow in the anode circuit of the tube but when the line voltage falls as a result of a fault on the line, the difference of potential is decreased between two of the elements, due to the fall in voltage, thus permitting more current to flow through the relay.

The invention will be understood more fully in connection with the accompanying drawing, wherein:

Figure 1 is a diagrammatic representation of a protective system constructed in accordance with the present invention.

Figure 2 is a diagrammatic representation of a protective system employing a modified form of a rectifying device.

Figure 3 is a diagrammatic representation of a further modified system in which a four element thermionic tube is employed.

Figure 4 is a diagrammatic representation of a further modified form of protective system constructed in accordance with the present invention.

Referring particularly to Figure 1, $a$ indicates an alternating current transmission line, one wire of which is grounded at $a'$. A circuit breaker is provided at $b$ to disconnect a portion of the line upon the occurrence of a fault which is of such character as to impair the operation of the system. The circuit breaker is tripped by a coil $b'$ connected in series with a source of energy, such as battery $b^2$ and contacts $b^3$. These contacts are closed by a relay $b^4$ connected in a circuit to be described presently.

In order that the relay be actuated in accordance with the principle set forth above, a condenser string $c$ is connected to the ungrounded line wire and grounded at $c'$. It is to be understood that this condenser string serves only as a source of potential and any mechanism capable of supplying the required voltage in proportion to the voltage of the line will serve equally well. Across the last condenser of the string, a resistance $c^2$ is connected, condenser $c^3$ being in series and condenser $c^4$ in parallel therewith. In this manner a voltage is obtained across the resistance which is proportional to the line voltage. Wire $c^5$ connects the resistance $c^2$ with a grid resistance $c^6$, the latter being grounded at $c^7$ and connected across the cathode and grid of an electron tube $d$. A current rectifier $c^8$ is connected in wire $c^5$ to permit current to flow only from the grid resistance $c^6$ to the condenser resistance $c^2$, thus causing the voltage drop across resistance $c^6$ to be impressed as a negative potential on the grid of the electron tube $d$ with respect to its cathode.

The thermionic tube is provided with a cathode circuit and source of energy to heat the cathode $d'$ and an anode circuit and source of energy $d^2$. The anode current flows through the primary of a transformer T which actuates the relay coil through circuit $t'$.

Connected in the transmission line is a current transformer $e$, across which is connected an impedance $e'$. One terminal of the impedance is grounded at $e^2$ and the other terminal connected to the grid of the thermionic tube through condenser $e^3$, the function of the condenser $e^3$ being to prevent the current from the tapped condenser string $c$ from flowing in the secondary circuit of the transformer $e$. Condenser $e^3$ also smooths out the rectified current in resistance $c^6$.

The operation of the apparatus is as follows: The voltage drop across the last condenser of the string is impressed across the condenser resistance leak $c^2$. This voltage is, in turn, impressed across the grid resistance $c^6$ and the current in this circuit is rectified to permit a flow from $c^6$ to $c^2$ only, thus causing the grid of the electron tube $d$ to be at negative potential with respect to the cathode. The voltage across impedance $e'$ varies in magnitude with the current in the transmission line and is applied to the grid of the electron tube $d$ to serve as the input thereto. The anode circuit is connected with a source of potential to cause the anode to be at positive potential with respect to the cathode. The current flowing in this circuit is controlled by the negative charge on the grid of the tube, the greater the charge the smaller being the current flow. The magnitude of the alternating component of the current in the anode circuit is proportional to the alternating voltage impressed across the grid and cathode of the tube from the impedance $e'$ which, in turn, is proportional in magnitude to the alternating current in the line, this component also being controlled in magnitude by the negative charge on the grid. The secondary of the transformer T supplies current to the relay $b^4$ in proportion to the alternating current in the anode circuit. If a fault occurs near the station, the voltage falls off to practically zero, while the current increases greatly. The negative charge is thus reduced and the alternating component of the current in the anode circuit is greatly increased. As the relay has an inverse time characteristic, the greater the current in circuit $t'$ the more rapidly relay $b^4$ will operate and trip breaker $b$. It is therefore apparent that the less the line voltage the faster relay $b^4$ will be operated by a given line current. Hence the breaker nearest the fault will be tripped first, thus relieving the line of the disturbance and preventing the relays in the adjacent sections from tripping their breakers.

With reference to Figure 2, the same current transformer, impedance, condenser string, relay and electron tube are used as in Figure 1 and their respective functions are likewise similar. In place of the rectifier shown in Figure 1, however, a two element electron tube $f$ is used. The cathode of the tube is connected across the last condenser of the string and the anode is connected to the wire $c^5$. In the anode circuit of the tube, a resistance $f'$ is inserted, this resistance also being in the anode circuit of the three element tube $d$. Under normal conditions of the line, the tube $f$ takes current from the anode circuit of tube $d$ and maintains the potential of the anode of tube $d$ below that which would enable sufficient current to flow in the anode circuit to cause the relay to operate. If the line voltage falls off, the impedance of tube $f$ increases, thus reducing the current flow through the resistance $f'$. This, in turn, reduces the voltage drop across resistance $f'$ and increases the voltage between the anode and cathode of tube $d$. The alternating current in circuit $t'$, therefore, increases as a result of the drop in line voltage and the increase in line current, and the resulting relay and breaker action is the same as in Figure 1.

In Figure 3 the same current transformer, impedance, condenser string and relay are used as in Figure 1 and the functions are likewise the same. A three element electron tube $h$ has its grid connected to the condenser string $c$. A rectifier $c^8$ is connected in the grid lead so that the direction of current flow is from the condenser string $c$ toward the grid through the rectifier $c^8$. Resistance $c^6$ is connected across the grid and cathode, and the cathode terminal is grounded at $c^7$. The consequent voltage drop across resistance $c^6$ is impressed as a positive potential on the grid with respect to the cathode of tube $h$. The anode of tube $h$ is connected through the wire $h'$ and the resistance $g'$ with an anode source of energy so that the anode of tube $h$ is positive with respect to the cathode. Resistance $g'$ is also in the circuit of the shield grid in the four element tube $g$. The anode of this tube is connected through the primary of transformer T with a source of energy, such as a battery, so that it is positive with respect to the cathode. A reduction in voltage in the line decreases the magnitude of the positive charge with respect to the cathode on the grid of tube $h$, thus increasing the impedance of the tube $h$ and decreasing the current through resistance $g'$. The potential on the shield grid of tube $g$ with respect to the cathode is increased, resulting in a greater current flow in the anode circuit of tube $g$, and causing relay $b^4$ and breaker $b$ to function as described in connection with the system shown in Figure 2.

The modification shown in Figure 4 embodies substantially the same characteristics as shown in Figure 1 in that a negative charge with respect to the cathode, proportional to the line voltage, is placed on the grid of the tube. In this case, however, the A. C. voltage drop across the impedance $e'$ is impressed as a positive charge on the grid of the tube with respect to the cathode. Another departure from the system shown in Figure 1 is the connection of a direct current inverse time relay in the anode circuit of tube $d$ in place of a transformer and an alternating current relay. This direct current relay is connected to the trip coil of the breaker b and functions in the same manner as does the A. C. relay in Figure 1.

It will be noted that to impress the voltage drop across impedance $e'$ as a positive charge on the grid of the tube, a rectifier $e^4$ is inserted in the lead connecting the impedance to the grid. The system shown in Figure 4 also includes filtering devices, which, in the case of the lead from impedance $e'$, consist of reactance $j$ and condensers $j'$ and $j^2$, and in the case of the lead from the condenser string, consist of reactance $i$ and condensers $i'$ and $i^2$.

The voltage tap from the transmission line may be taken directly from the insulating bushing of a transformer or other equipment, thus eliminating the necessity of providing such additional apparatus and the specific instruments used may be varied in accordance with common practice. No claim is made to the specific form of relay, tube, etc., used, the invention residing in the combination, as described above, to provide the protection afforded. It is to be understood that the invention may be applied to many systems where a direct current is derived from an alternating current source as, for example, to operate meters, etc. Although the invention has been described with reference to the constructions shown in the accompanying drawing, it is not to be limited, save as defined in the appended claims.

We claim as our invention:

1. A protective system for an alternating current transmission line, comprising means to disconnect a portion of the transmission line, a circuit for the disconnecting means, an electron tube in the circuit, means to apply a voltage between two elements of the tube from the transmission line to cause the current in the anode circuit to vary as a direct function of the current in the transmission line, means connected to the transmission line to apply a unidirectional potential between two elements of the tube proportional to the voltage of the line, and means for causing the current so used in maintaining the unidirectional potential to be a direct current.

2. A protective system for an alternating current transmission line comprising, means to disconnect a portion of the line, a circuit for the disconnecting means, an electron tube in the circuit, the tube having an anode, a cathode, and a grid, means to apply a voltage between two elements of the tube from the transmission line to cause the current in the anode circuit of the tube to vary as a direct function of the current in the line, and means connected to the transmission line to apply a continuous negative potential on the grid of the tube with respect to the cathode to cause the current in the anode circuit to vary as an inverse function of the voltage in the line.

3. A protective system for an alternating current transmission line comprising, means to disconnect a portion of the line, a circuit for the disconnecting means, an electron tube in the circuit, means to apply a voltage between two elements of the tube from the transmission line to cause the current in the anode circuit of the tube to vary as a direct function of the current in the line, means to produce a direct current proportional to the voltage in the line and means to produce a negative potential on the grid of the tube with respect to the cathode to vary as the said direct current.

4. A protective system for alternating current transmission lines comprising, means to disconnect a portion of the line, a circuit for the disconnecting means, an electron tube in the circuit, means to apply a voltage between two elements of the tube from the transmission line to cause the current in the anode circuit of the tube to vary as a direct function of the current in the transmission line; a condenser string connected to the line, means connected to the condenser string to apply a negative potential to the grid of the tube with respect to the cathode, said means including means to produce a direct current proportional to the voltage of the line, and means to ground the condenser string.

5. A protective system for an alternating current transmission line comprising, means to disconnect a portion of the transmission line, a circuit for the disconnecting means, an electron tube in the circuit, a current transformer in the transmission line, means to apply a voltage to the input circuit of the tube from the current transformer, a condenser string connected to the transmission line, means to ground one end of the string, a rectifying device, and means connecting the rectifying device and condensers to apply the voltage between certain of the condensers to the grid of the tube.

6. A protective system for an alternating current transmission line comprising means to disconnect a portion of the transmission line, a circuit for the disconnecting means, an electron tube in the circuit, a current transformer in the transmission line, an impedance across the transformer, means to ground the impedance, means to connect the impedance to the input circuit of the tube through a condenser, a condenser string, a rectifying device, means to apply the voltage of certain of the condensers of the string between the grid and cathode elements of the tube through the rectifying device to place a negative potential on the grid with respect to the cathode, and means to ground one element of the tube.

7. A protective system for an alternating current transmission line comprising means to disconnect a portion of the transmission line, a circuit for the disconnecting means, an electron tube in the circuit, a current transformer in the transmission line, an impedance across the transformer, means to ground the impedance, means to connect the impedance to the input circuit of the tube through a condenser, a condenser string, a rectifying device, an impedance connected across the cathode and grid of the tube and grounded, and means connecting the rectifying device and condenser to apply the voltage of certain of the condensers of the string across the impedance.

8. A protective system for an alternating current transmission line comprising, means to disconnect a portion of the transmission line, a circuit for the disconnecting means, an electron tube in the circuit, a current transformer in the transmission line, a grounded impedance across the transformer, means to connect the impedance to the input circuit of the tube through a condenser, a condenser string, a second impedance across certain of the condensers in the string, a rectifying device, a third impedance connected between the cathode and grid of the tube and grounded, and means connecting the rectifying device, condensers and third impedance to apply the voltage of the second impedance across the third impedance.

9. An electroresponsive system comprising a current responsive device, means to operate the current responsive device, an auxiliary circuit for the operating means, a current responsive means in a transmission line tending to cause a current flow in the auxiliary circuit, means to cause the current from the current responsive means to be a direct current, means responsive to the voltage of the transmission line to produce a current for opposing the last named current, and means to cause the opposing current to be a direct current.

10. A protective system for an alternating current transmission line comprising means to disconnect a portion of the transmission line, a circuit for the disconnecting means, means connected to the circuit to rectify a current from the transmission line, and means connected to the circuit to rectify a second current from the transmission line to oppose the first current and maintain the disconnecting means inoperative.

11. A protective system for an alternating current transmission line comprising means to disconnect a portion of the transmission line, a circuit for the disconnecting means, an electron tube in the circuit having a grid, means connected to the tube to rectify a current from the transmission line, and means connected to the grid of the tube to rectify a second and independent current from the transmission line to maintain a negative bias on the grid to maintain the disconnecting means inoperative.

12. A protective system for alternating current transmission lines comprising means to disconnect a portion of the transmission line, a circuit for the disconnecting means, means connected to the circuit to produce a current therein proportional to the current in the transmission line, means to rectify the current so produced to exert an operating force upon the disconnecting means, and means to produce an independent direct current to oppose the first current.

GERALD V. CRUISE.
SOL E. SCHULTZ.